United States Patent
Han et al.

(10) Patent No.: US 7,894,030 B2
(45) Date of Patent: Feb. 22, 2011

(54) LIQUID CRYSTAL DISPLAY AND METHOD HAVNG THREE PIXEL ELECTRODES ADJACENT EACH OTHER IN A COLUMN DIRECTION CONNECTED WITH THREE RESPECTIVE GATE LINES THAT ARE COMMONLY CONNECTED AND THREE DATA LINES, TWO OF WHICH ARE OVERLAPPED BY ALL THREE PIXEL ELECTRODES

(75) Inventors: Sang-Ho Han, Incheon (KR); Jeong-Geun Yoo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 961 days.

(21) Appl. No.: 11/677,325

(22) Filed: Feb. 21, 2007

(65) Prior Publication Data

US 2007/0206011 A1    Sep. 6, 2007

(30) Foreign Application Priority Data

Feb. 22, 2006   (KR) ..................... 10-2006-0017081

(51) Int. Cl.
G02F 1/1343    (2006.01)
(52) U.S. Cl. ......................... 349/139; 349/142; 349/145
(58) Field of Classification Search ................. 349/139, 349/144–146
See application file for complete search history.

(56) References Cited

U.S. PATENT DOCUMENTS

| | | | |
|---|---|---|---|
| 6,661,491 B2 * | 12/2003 | Yamakita et al. ............ 349/139 |
| 6,724,452 B1 | 4/2004 | Takeda et al. | |
| 7,253,857 B2 * | 8/2007 | Nakayoshi et al. .......... 349/114 |
| 7,532,294 B2 * | 5/2009 | Kim et al. .................... 349/141 |
| 2004/0189916 A1 * | 9/2004 | Song .......................... 349/139 |
| 2005/0140893 A1 | 6/2005 | Hong | |

FOREIGN PATENT DOCUMENTS

| | | |
|---|---|---|
| CN | 1580923 | 2/2005 |
| CN | 1628262 | 6/2005 |
| JP | 11-052381 | 2/1999 |
| JP | 2000-214827 | 8/2000 |
| JP | 2003-005214 | 1/2003 |
| JP | 2003-029235 | 1/2003 |
| JP | 2004-151578 | 5/2004 |
| JP | 2005092247 | 4/2005 |
| KR | 1020020030447 | 4/2002 |
| KR | 1020020036313 | 5/2002 |
| KR | 1020040057694 | 7/2004 |
| KR | 1020040061496 | 7/2004 |
| KR | 1020050008040 | 1/2005 |

* cited by examiner

Primary Examiner—John Heyman
(74) Attorney, Agent, or Firm—Cantor Colburn LLP (57) ABSTRACT

A liquid crystal display device and method therefore include a substrate; first, second and third pixel electrodes formed on the substrate and adjacent to each other in a row direction; first, second and third gate lines connected to the first, second and third pixel electrodes, respectively; and first, second and third data lines which cross the first, second and third gate lines and connected to the first, second and third pixel electrodes, respectively. Each of the first to third pixel electrodes includes at least two parallelogrammic electrode portions each with inclination directions different from each other, at least two data lines of the first to third data lines are overlapped by the first to third pixel electrodes, and the first to third gate lines are connected to each other.

19 Claims, 7 Drawing Sheets

LIQUID CRYSTAL DISPLAY AND METHOD HAVNG THREE PIXEL ELECTRODES ADJACENT EACH OTHER IN A COLUMN DIRECTION CONNECTED WITH THREE RESPECTIVE GATE LINES THAT ARE COMMONLY CONNECTED AND THREE DATA LINES, TWO OF WHICH ARE OVERLAPPED BY ALL THREE PIXEL ELECTRODES

This application claims priority to Korean Patent Application No. 10-2006-0017081, filed on Feb. 22, 2006, and all the benefits accruing therefrom under 35 U.S.C. §119, the contents of which in its entirety are herein incorporated by reference.

BACKGROUND OF THE INVENTION (a) Field of the Invention

The present invention relates to a liquid crystal display. More particularly, the present invention relates to a liquid crystal display which displays color images in a temporal division manner.

(b) Description of the Related Art

Generally, a liquid crystal display device includes an upper panel on which a common electrode and color filters are formed, a lower panel on which thin film transistors and pixel electrodes are formed, and a liquid crystal layer disposed between the upper and lower panels. When applying a potential difference to the pixel electrodes and the common electrode, an electric field is generated in the liquid crystal layer, and the orientation of liquid crystal is determined on the basis of the electric field. Since the transmittance of incident light is determined on the basis of the aligned direction of liquid crystal molecules, it is possible to display a desired image by adjusting the potential difference between the two electrodes.

In order to realize color representation in such a liquid crystal display, each pixel displays any one of the primary colors such as red, green and blue, for example. Alternatively, all of the pixels each display the primary colors such as red, green and blue, for example, as time passes. The former refers to a spatial division method and the latter refers to a temporal division method.

According to the spatial division method, red, green and blue color filters are disposed in regions corresponding to the pixel electrodes to display color images. In this case, the color images can be displayed by passing light emitted from a white light source such as a light emitting diode ("LED") or a cold cathode fluorescent lamp ("CCFL") through the liquid crystal layer and the color filters.

According to the temporal division method, the liquid crystal display displays color images by providing an additional light source which emits color light components. In this temporal division method, all pixels are scanned corresponding to the operation of a gate driver and a data driver, and then a red light source is turned on. Thereafter, all pixels are scanned again, and a green light source is turned on. Finally, all pixels are scanned again, and a blue light source is turned on. Therefore, three frames (hereinafter, referred to sub-frames) are performed during a time (about 16.6 ms) corresponding to one frame of the spatial division method. Therefore, the time for each of the sub-frames is reduced to about 5.5 ms or less, which is one third of the one frame time (e.g., 16.5 ms).

Thus, since data is scanned and the light sources are turned on for a short time of about 5.5 ms, the scanning and turning-on should be performed three-times faster speed than in the case of using color filters. Therefore, there is a problem in that the charging time of the liquid crystal capacitor is decreased, and the problem becomes more serious in the case of a large liquid crystal display device. Further, there is another problem in that desired color cannot be displayed due to a reduced turned-on time of the light source.

Therefore, there is a desire to improve the image quality of the display device by increasing the charge time of the pixels, and to secure the wide visibility of the liquid crystal display device.

BRIEF SUMMARY OF THE INVENTION

An exemplary embodiment of the present invention provides a liquid crystal display device including a substrate, first, second and third pixel electrodes formed on the substrate and adjacent to each other in a row direction, first, second and third gate lines connected to the first, second and third pixel electrodes, respectively, and first, second and third data lines which cross the first, second and third gate lines and connected to the first, second and third pixel electrodes, respectively. Each of the first to third pixel electrodes includes at least two parallelogrammic electrode portions with different inclination directions from each other, at least two data lines of the first to third data lines being overlapped by the first to third pixel electrodes, and the first to third gate lines are connected to each other.

The liquid crystal display device may further include a light source unit which includes a plurality of single color light sources, and which emits light onto the substrate.

The single color light sources may emit three color light components.

The single color light sources may emit a red, green or blue light component.

The single color light sources may include a light emitting diode.

The first to third data lines may have at least one curved portion in the inclination direction of the parallelogrammic electrode portions.

At least one of the first to third pixel electrodes may further include a plurality of cutouts which expose at least a portion of the first to third data lines.

At least one of the first to third pixel electrodes may further include a plurality of protrusions extending from one side of the first to third pixel electrodes.

The first to third gate lines may be supplied with the same gate signal.

The gate signal may be a gate-on signal applied for one horizontal period.

The liquid crystal display device may include a common electrode facing the pixel electrodes. The common electrode may include an inclination direction determining member.

The inclination direction determining member may include cutouts which extend along the inclination direction of the parallelogrammic electrode portions in a row direction.

The inclination direction determining member may include protrusions which extend along the inclination direction of the parallelogrammic electrode portions in a row direction.

The liquid crystal display device may further include an organic layer formed between the first to third pixel electrodes and the first to third data lines.

The liquid crystal display device may further comprise fouth gate line that are connected to the first to third gate lines.

The inclination degrees of the parallelogrammic electrode portions relative to the first, the second and the third data lines may be about 45° or about 135°.

Another exemplary embodiment of the present invention provides a liquid crystal display device, the liquid crystal display device comprising: a substrate; first, second and third pixel electrodes formed on the substrate, and are adjacent to each other in a row direction; first, second and third gate lines connected to the first, second and third pixel electrodes, respectively; and first, second and third data lines which cross the first, second and third gate lines and are connected to the first, second and third pixel electrodes, respectively, wherein each of the first to third pixel electrodes has a pair of bent edges substantially parallel to each other, at least two data lines of the first to third data lines being overlapped by the first to third pixel electrodes, and the first to third gate lines are connected to each other.

The bent edges may be bent at least once.

Another exemplary embodiment of the present invention provides a method of manufacturing a liquid crystal display device, the method including: forming first, second and third pixel electrodes adjacent to each other in a row direction on a substrate, each of the first to third pixel electrodes are formed to include at least two parallelogrammic electrode portions with different inclination directions from each other; connecting first, second and third gate lines to the first, second and third pixel electrodes, respectively; forming first, second and third data lines to cross the first, second and third gate lines and connected to the first, second and third pixel electrodes, respectively, overlapping at least two data lines of the first to third data lines with the first to third pixel electrodes, and connecting the first to third gate lines to each other.

BRIEF DESCRIPTION OF THE DRAWINGS

The present invention will become more apparent by describing exemplary embodiments thereof in more detail with reference to the accompanying drawings, in which.

DETAILED DESCRIPTION OF THE INVENTION

The present invention will now be described more fully hereinafter with reference to the accompanying drawings, in which exemplary embodiments of the present invention are shown. Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element or layer, the element or layer can be directly on or connected to another element or layer or intervening elements or layers that may also be present. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed, No language in the specification should be construed as indicating any non-claimed element as essential to the practice of the invention as used herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

First, referring to FIGS. 1 to 3, a liquid crystal display device according to an exemplary embodiment of the present invention will be described in more detail.

Figure 1:
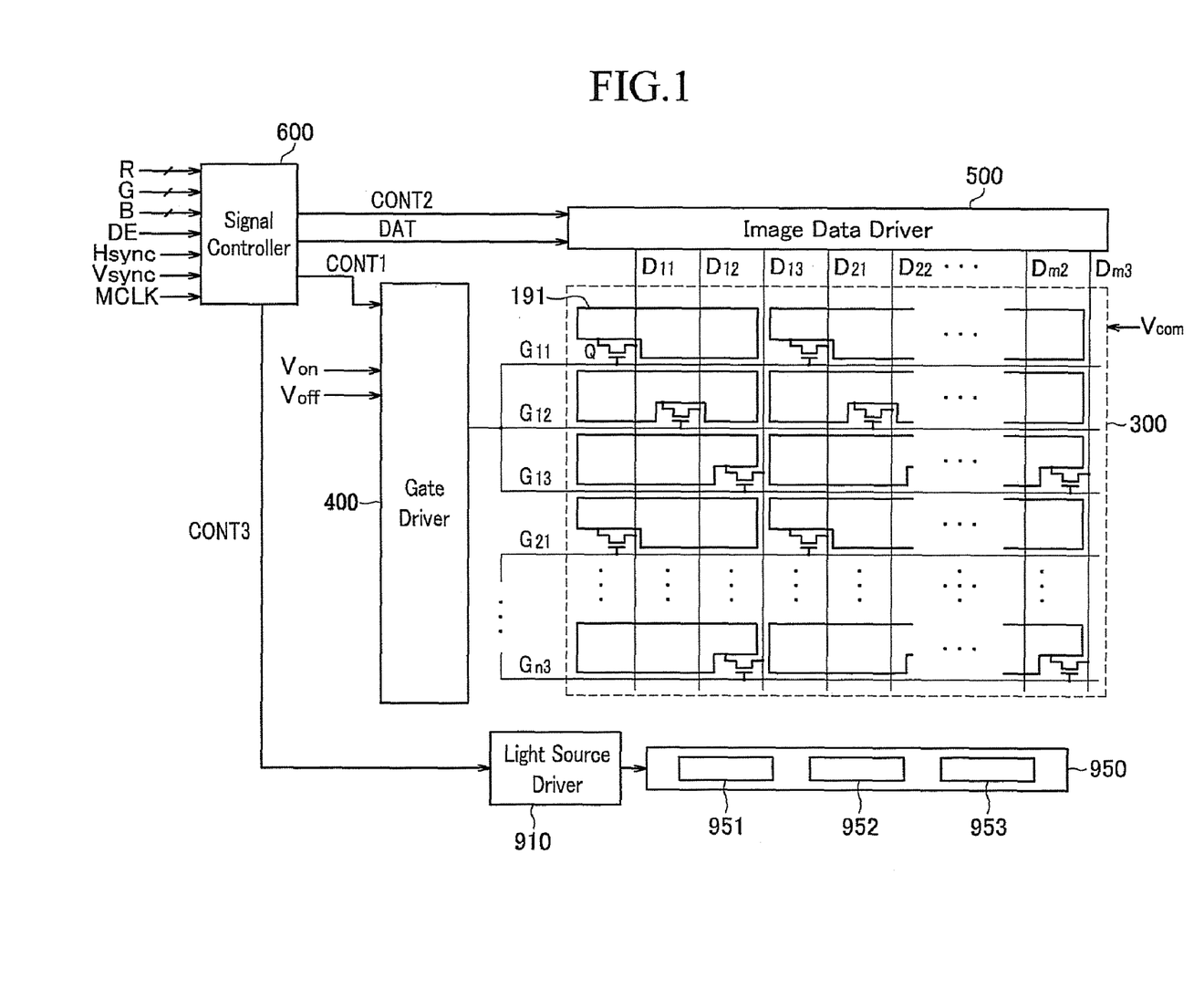
FIG. 1 is a block diagram of a liquid crystal display device according to an exemplary embodiment of the present invention.

FIG. 1 is a block diagram of a liquid crystal display device according to an exemplary embodiment of the present invention. FIG. 2 is an equivalent circuit diagram of one pixel of the liquid crystal display device of FIG. 1 according to the exemplary embodiment of the present invention.

As shown in FIG. 1, the liquid crystal display device includes a liquid crystal panel assembly 300, a gate driver 400 connected to the liquid crystal panel assembly 300, a data driver 500, a gray voltage generating unit 800 connected to the data driver 500, a light source unit 950 which supplies light to the liquid crystal panel assembly 300, a light source driver 910 connected to the light source 950, and a signal controller 600 which controls the above members.

Figure 2:
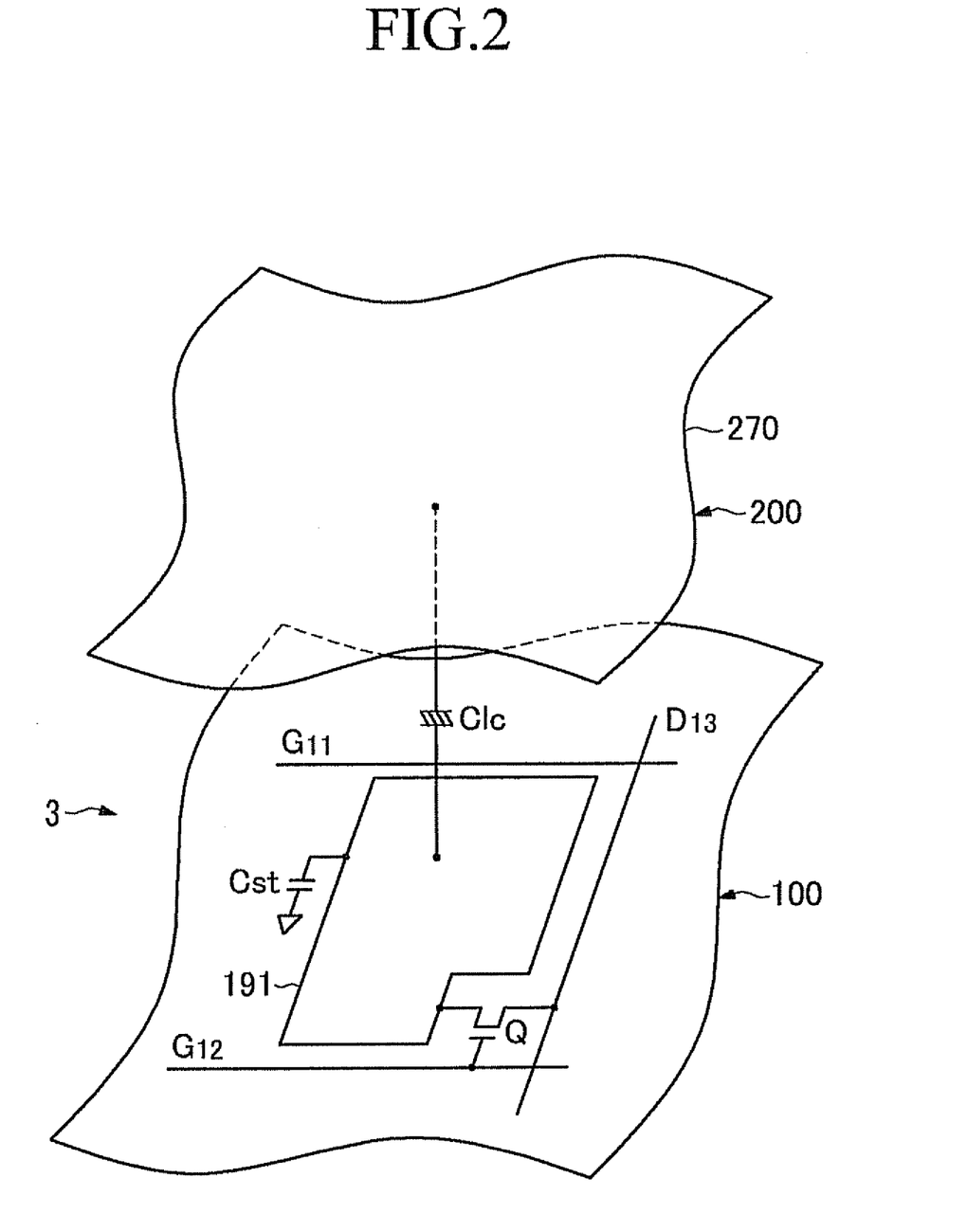
FIG. 2 is an equivalent circuit diagram of one pixel of the liquid crystal display device of FIG. 1 according to the exemplary embodiment of the present invention.

The liquid crystal panel assembly 300 includes a plurality of signal lines $G_{11}, G_{12}, G_{13}, G_{21}, \ldots, G_{n3}, D_{11}, D_{12}, D_{13}, D_{21}, \ldots, D_{m3}$ and a plurality of pixels connected to the signal lines and substantially arranged in a matrix, as illustrated in the equivalent circuit diagram of FIG. 2. Further, as shown in FIG. 1, the liquid crystal panel assembly 300 includes lower and upper panels 100 and 200, respectively, facing each other and a liquid crystal layer 3 interposed therebetween.

The signal lines $G_{11}, G_{12}, G_{13}, G_{21}, \ldots, G_{n3}, D_{11}, D_{12}, D_{13}, D_{21}, \ldots, D_{m3}$ include a plurality of gate lines $G_{11}, G_{12}, G_{13}, G_{21}, \ldots, G_{n3}$ which transmit gate signals (also referred to as scanning signals), and a plurality of data lines $D_{11}, D_{12}, D_{13}, D_{21}, \ldots, D_{m3}$ which transmit data signals.

The gate lines $G_{11}, G_{12}, G_{13}, G_{21}, \ldots, G_{n3}$ extend in a row direction to be substantially parallel to each other, and are connected to output terminals of the gate driver 400 in a unit of groups, each group consisting of a predetermined number of gate lines $G_{11}, G_{12}, G_{13}, G_{21}, \ldots, G_{n3}$, as illustrated in FIGS. 1 and 2. As shown in FIG. 1, when the number of gate lines is three, a first gate line group consisting of three gate lines $G_{11}, G_{12}$ and $G_{13}$ is connected to a first output terminal of the gate driver 400, and an n-th gate line group consisting of gate lines $G_{n1}, G_{n2}$, and $G_{n3}$ is connected to the last output terminal of the gate driver 400. In this exemplary embodiment, one gate line group has three gate lines, but the number of gate lines is not limited thereto, and can be varied.

The data lines $D_{11}, D_{12}, D_{13}, D_{21}, \ldots, D_{m3}$ extend in a column direction to be parallel to each other, and at least a part of the data lines cross the pixels, as illustrated in FIGS. 1 and 2.

Each of the pixels includes a switching element Q connected to a gate line, for example a second gate line $G_{12}$ of the first gate line group, and a data line, for example a third data line $D_{13}$, a liquid crystal capacitor Clc, and a storage capacitor Cst connected thereto. The storage capacitor Cst may be omitted in alternative exemplary embodiments.

The switching element Q is a three terminal element such as a thin film transistor provided at the lower panel 100. A control terminal thereof is connected to the gate line $G_{12}$, an input terminal thereof is connected to the data line $D_{13}$, and an output terminal is connected to the liquid crystal capacitor Clc and the storage capacitor Cst.

The liquid crystal capacitor Clc includes a pixel electrode 191 of the lower panel 100 and a common electrode 270 of the upper panel 200 as two terminals, and a liquid crystal layer 3 between the two electrodes 191 and 270 serve as a dielectric. The pixel electrode 191 is connected to the output terminal of the switching element Q, and the common electrode 270 is formed on a facing surface of the upper panel 200 and supplied with a common voltage Vcom. Differing from FIG. 2, the common electrode 270 may be provided on the lower panel 100, and in this case, at least one of two electrodes 191 and 270 may have a shape of a bar or a stripe.

The storage capacitor Cst which supplements the liquid crystal capacitor Clc is formed such that an additional signal line (not shown) provided on the lower panel 100 and the pixel electrode 191 overlap with an insulating material therebetween, and the additional signal line is supplied with a predetermined voltage such as a common voltage Vcom. Alternatively, the storage capacitor Cst includes the pixel electrode 191 and an adjacent gate line called a previous gate line, which is overlapped by the pixel electrode 191 via an insulator therebetween.

The data lines $D_{11}, D_{12}, D_{13}, D_{21}, \ldots, D_{m3}$ are formed of a plurality of data line groups including a predetermined number of data lines, and the connecting relationship between the data lines of the data line groups and the switching elements Q changes depending on the connecting relationship between the gate lines of the gate line groups and the switching elements Q. That is, a first data line of the data line group is connected to a switching element connected to a first gate line of the gate line group, and a second data line of the data line group is connected to a switching element connected to a second gate line of the gate line group. In this manner, after the data lines of the data line group are connected to the corresponding switching elements, the last data line is connected to a switching element connected to the last gate line of the gate line group.

Therefore, the number of gate lines of each of the gate line groups is the same as the number of data lines of each of the data line groups. As shown in FIG. 1, one data line group includes three data lines. The first data lines $D_{11}$, $D_{21}$, $D_{31}$, ... of the respective data line groups are connected to the switching elements Q connected to the first gate lines $G_{11}$, $G_{21}$, $G_{31}$, ... of the respective gate line groups, the second data lines $D_{12}$, $D_{22}$, $D_{32}$, ... of the respective data line groups are connected to the switching elements Q connected to the second gate lines $G_{12}$, $G_{22}$, $G_{32}$, ... of the respective gate line groups, and the third data lines $D_{13}$, $D_{23}$, $D_{33}$, ... of the respective data line groups are connected to the switching elements Q connected to the first gate lines $G_{13}$, $G_{23}$, $G_{33}$, ... of the respective gate line groups. In this case, the first and second data lines $D_{11}$, $D_{12}$, $D_{21}$, $D_{22}$, ... among three data lines of each data line group intersect the pixel electrodes 191. In alternative exemplary embodiments, all of the data lines may intersect the pixel electrodes, or data lines excluding the first and last data lines may intersect the pixel electrodes.

Even though the switching elements Q are formed below the pixel electrodes 191 in FIG. 1, the switching elements Q may be formed over the pixel electrodes 191 in alternative exemplary embodiments. Further, even though the gate lines $G_{11}$, $G_{12}$, $G_{13}$, $G_{21}$, ..., $G_{n3}$) are formed below the pixel electrodes 191, the gate lines may be formed over the pixel electrodes 191 in alternative exemplary embodiments. Even though the data lines $D_{11}$, $D_{12}$, $D_{13}$, $D_{21}$, ..., $D_{m3}$ are shown to be formed at the right side of the switching elements Q, they may be formed at the left side of the switching elements Q in alternative exemplary embodiments.

At least one polarizer (not shown) which polarizes light is attached at an outer side of the liquid crystal panel assembly 300.

Referring to FIG. 1, the gray voltage generating unit 800 generates two groups of gray voltages (or groups of reference gray voltages) which are related to the transmittance of the pixels. One of the two groups has a positive value with respect to the common voltage Vcom, and the other group has a negative value with respect to the common voltage.

The gate driver 400 is connected to the gate lines ($G_{11}$, $G_{12}$, $G_{13}$, $G_{21}$, ..., $G_{n3}$ of the liquid crystal panel assembly 300 to supply gate signals including a combination of a gate-on voltage Von and a gate-off voltage Voff to the gate lines $G_{11}$, $G_{12}$, $G_{13}$, $G_{21}$, ..., $G_{n3}$. Same gate signals are supplied to three gate lines of the same gate line group.

The data driver 500 is connected to the data lines $D_{11}$, $D_{12}$, $D_{13}$, $D_{21}$, ..., $D_{m3}$ of the liquid crystal panel assembly 300, and selects a gray voltage from the gray voltage generating unit 800 to supply to the data lines $D_{11}$, $D_{12}$, $D_{13}$, $D_{21}$, ..., $D_{m3}$ as data signals. However, when the gray voltage generating unit 800 generates only a few of the reference gray voltages rather than all of the gray voltages, the data driver 500 may divide the reference gray voltages to generate the data voltage among the divided gray voltages.

The light source unit 950 may be a light emitting diode ("LED"), and includes a plurality of light sources 951, 952, and 953 displaying a basic color. Examples of the basic color include three primary colors such as red, green and blue, for example, but is not limited thereto. The red, green and blue light sources are sequentially turned on and off, so that the pixel alternately displays the primary colors as time passes (e.g., temporal division) to recognize a desired color by the spatial-temporal summation of the basic colors.

The light source driver 910 controls the light source unit 950 to turn on and off.

The signal controller 600 controls the gate driver 400, the data driver 500 and the light source driver 910.

These drivers 400, 500, 600, 800 and 910 are mounted directly on the liquid crystal panel assembly 300 in the form of a single integrated circuit ("IC") chip, or mounted on a flexible printed circuit film (not shown) to be attached to the liquid crystal panel assembly 300 in the form of a tape carrier package ("TCP"). Alternatively, these drivers may be mounted on a separate printed circuit board ("PCB") (not shown). On the contrary, these drivers 400, 500, 600, 800 and 910 are integrated with signal lines $G_{11}$, $G_{12}$, $G_{13}$, $G_{21}$, ..., $G_{n3}$, $D_{11}$, $D_{12}$, $D_{13}$, $D_{21}$, ..., $D_{m3}$ and the thin film transistor switching elements Q onto the liquid crystal panel assembly 300. The drivers 400, 500, 600, 800 and 910 may be integrated into a single chip, and at least one of the drivers or at least one circuit element of the drivers may be formed outside of the single chip.

Next, referring to FIGS. 3 to 6B, the liquid crystal panel assembly 300 according to the exemplary embodiment of the present invention will be described in more detail.

Figure 3:
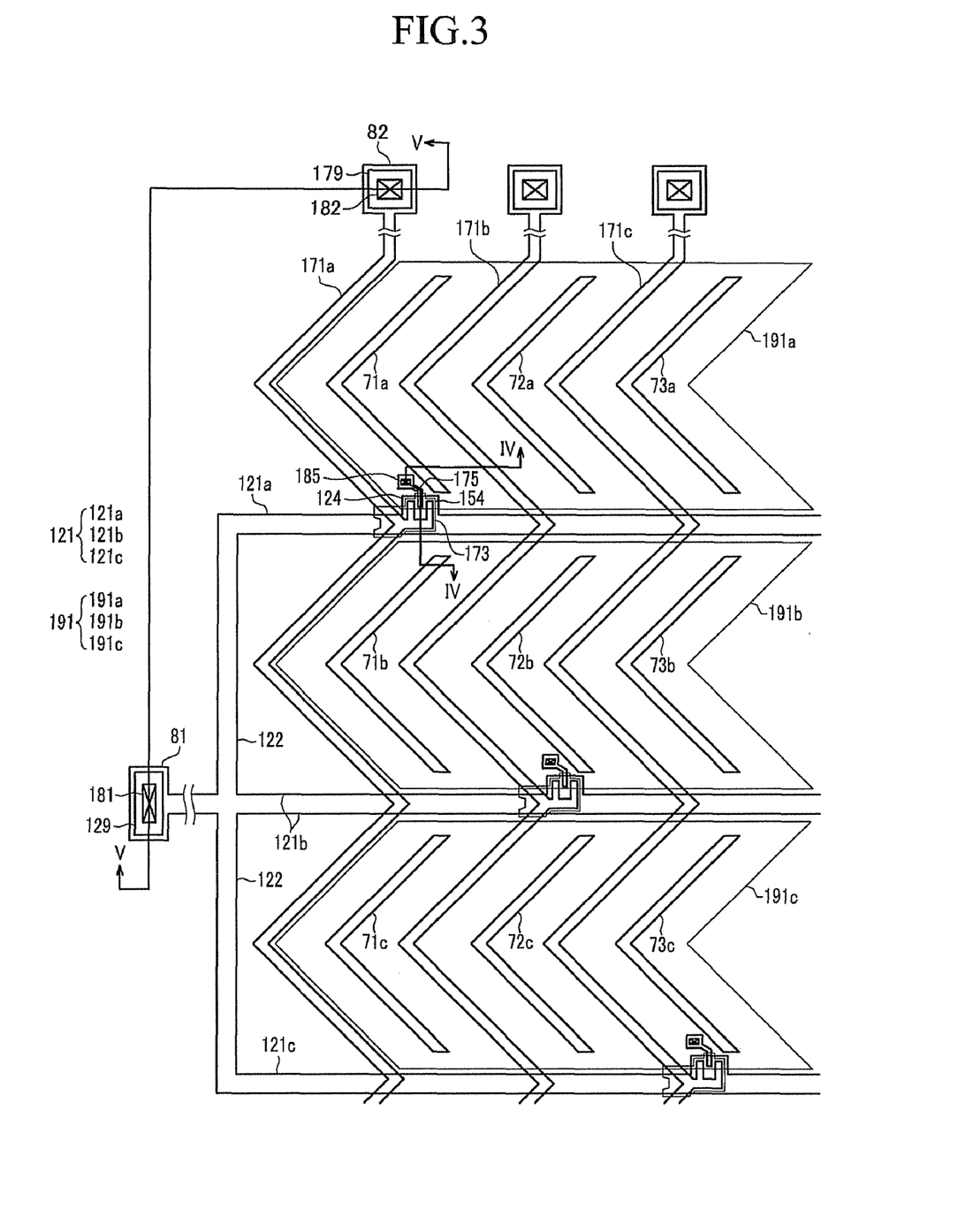
FIG. 3 is a diagram showing an arrangement of the liquid crystal display device according to the exemplary embodiment of the present invention.
Figure 4:
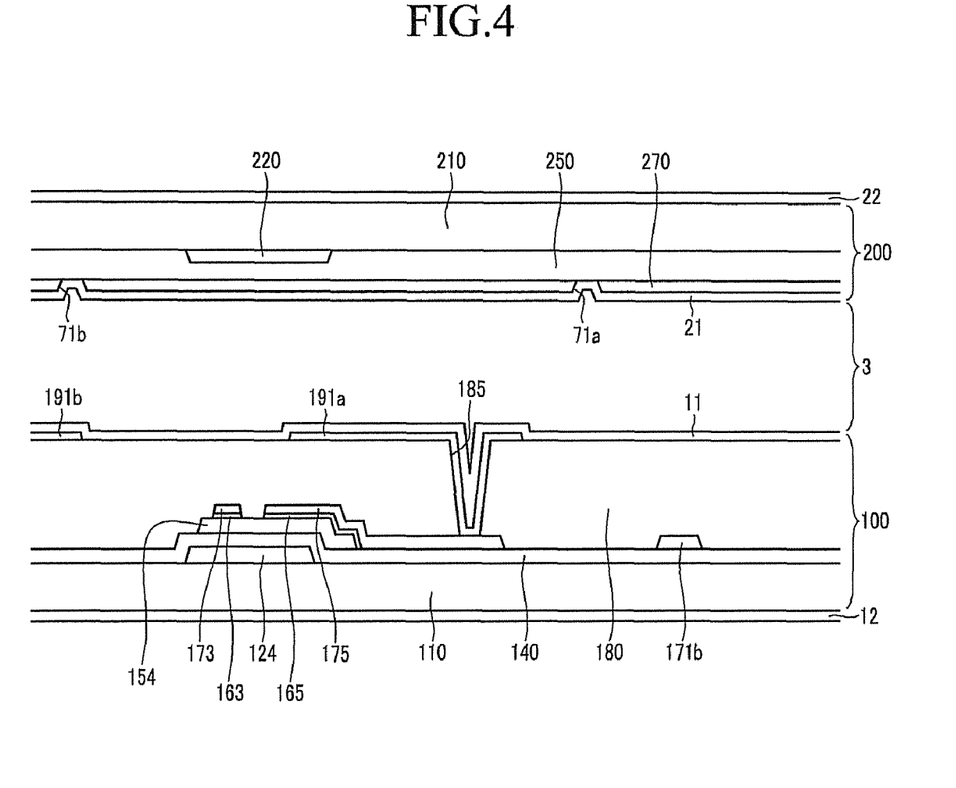
FIG. 4 and FIG. 5 are cross-sectional views of the liquid crystal display device shown in FIG. 3 taken along the lines IV-IV and V-V, respectively.
Figure 5:
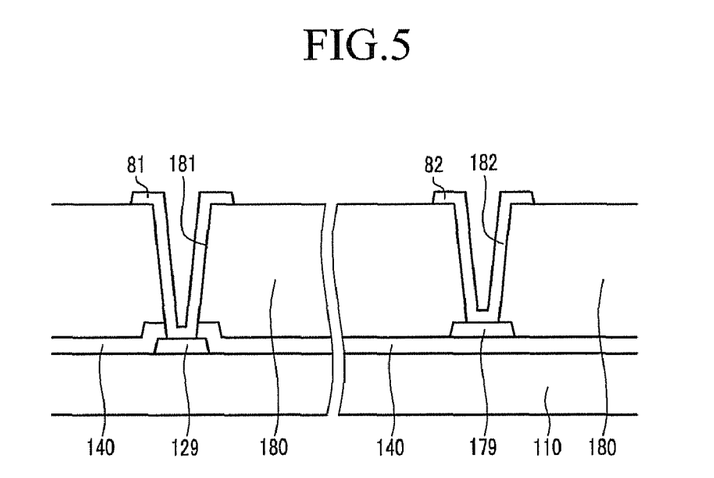
Figure 6A:
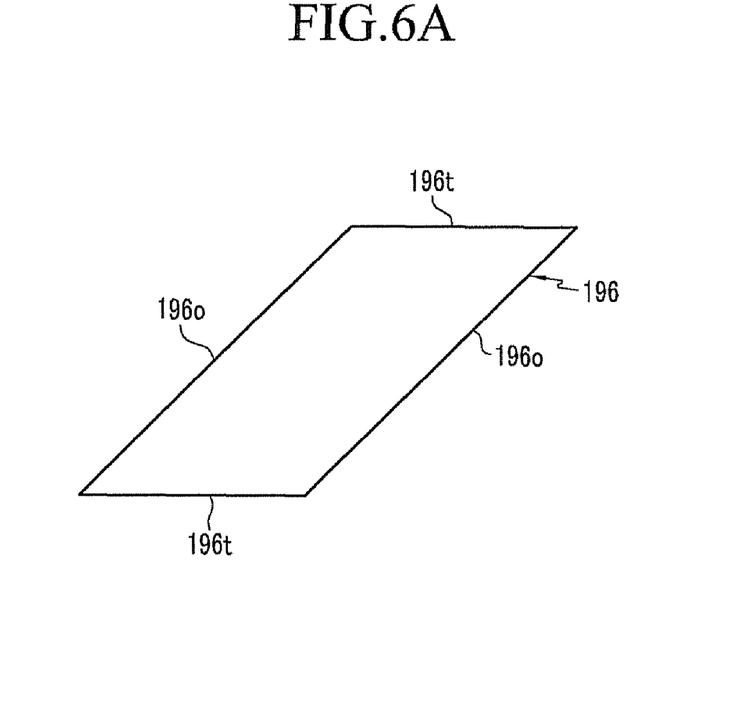
FIG. 6A and FIG. 6B are plan views showing a pixel electrode of the liquid crystal display device according to the exemplary embodiment of the present invention.
Figure 6B:
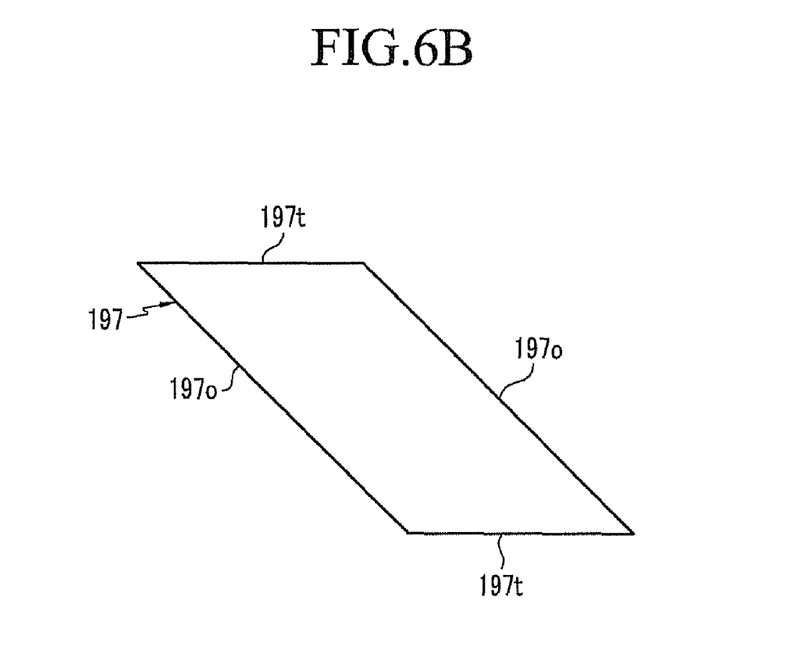

FIG. 3 is a diagram showing an arrangement of the liquid crystal display device according to the exemplary embodiment of the present invention. FIGS. 4 and 5 are cross-sectional views of the liquid crystal display device shown in FIG. 3 taken along the lines IV-IV and V-V, respectively. FIGS. 6A 6B are plan views showing a pixel electrode of the liquid crystal display device according to the exemplary embodiment of the present invention.

Referring to FIGS. 3 to 5, the liquid crystal panel assembly according to the exemplary embodiment of this invention includes a thin film transistor display panel 100, a common electrode display panel 200, and a liquid crystal layer 3 interposed between the two display panels 100 and 200.

First, the thin film transistor display panel 100 will be described in more detail.

A plurality of gate lines 121 are formed on an insulating substrate 110 formed of transparent glass, for example, but is not limited thereto.

The gate lines 121 transmit gate signals and extend in a traverse direction, as illustrated in FIG. 3. Each of the gate lines 121 includes a wide end portion 129 to contact the plurality of gate electrodes 124 protruding in upper and lower directions and other layers or the gate driver 400.

The gate line 121 includes three adjacent gate lines 121a, 121b and 121c. The three gate lines 121a, 121b and 121c are connected to each other through a connecting unit 122 and share the wide end portion 129. Therefore, it is possible to reduce the number of gate drivers 400.

The gate lines 121 may be formed of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), and other suitable metals and metal alloys. The above materials may have a multilayer structure including two conductive layers (not shown) having different physical properties. One of conductive layers is formed of an aluminum-based metal, a silver-based metal, or a copper-based metal having low resistivity so as to reduce signal delay or voltage drop. The other conductive layer may be formed of a different material, specifically, a material having excellent physical, chemical and electrical contact properties with indium tin oxide ("ITO") and indium zinc oxide ("IZO"), for example, a molybdenum-based metal, chromium (Cr), tantalum (Ta), titanium (Ti), or other suitable materials. A preferred example of the above combination includes a combination of a chromium lower layer and an aluminum (alloy) upper layer, or a combination of an aluminum (alloy) lower layer and a molybdenum (alloy) upper layer. The gate lines 121 may be formed of various metals or conductors other than the above enumerated materials.

The lateral sides of the gate lines 121 are inclined with respect to a surface of the substrate 121, and the inclination angle is in a range of about 30 degrees to about 80 degrees.

A gate insulating layer 140 formed of silicon nitride ("SiN$_x$") or silicon oxide ("SiO$_x$") is formed on the gate line 121.

A plurality of semiconductor islands 154 formed of hydrogenated amorphous silicon ("a-Si") or polycrystalline silicon are formed on the gate insulating layer 140. The semiconductor islands 154 are positioned on the gate electrodes 124.

A pair of ohmic contact islands 163 and 165 is formed on each of the semiconductor islands 154. The ohmic contact islands 163 and 165 may be formed of a material such as n+ hydrogenated amorphous silicon in which an n-type impurity is doped at a high concentration, or silicide.

The lateral sides of the semiconductor islands 154 and the ohmic contacts 163 and 165 are inclined with respect to the surface of the substrate 110, and the inclination angle is in a range of about 30 degrees to about 80 degrees.

A plurality of data conductors which include a plurality of data lines 171a, 171b and 171c formed on the gate insulating layer 140 and a plurality pairs of drain electrodes 175 formed on the ohmic contacts 163 and 165 and the gate insulating layer 140.

The data lines 171a, 171b and 171c transmit data signals and extend substantially in a longitudinal direction so as to cross the gate lines 121, as illustrated in FIG. 3. Each of the data lines 171a, 171b and 171c extends toward respective gate electrodes 124 and includes a corresponding wide end portion 179 so as to be connected with a plurality of U shaped source electrodes 173 and the other layers or the data driver 500 (FIG. 1). When the data driver 500 is integrated onto the substrate 110, the data lines 171 are elongated to be directly connected to the data driver 500.

The drain electrodes 175 are separated from each other and from the data lines 171a, 171b and 171c. The drain electrodes 175 face the source electrodes 173 with the gate electrodes 124 interposed therebetween. The drain electrodes 175 run straight upward from an end which is surrounded by the source electrodes 173, as best seen with reference to FIG. 3.

The gate electrodes 124, the source electrodes 173 and the drain electrodes 175 form a thin film transistor ("TFT") Q together with the semiconductor island 154, and channels of the thin film transistor Q are formed in the semiconductor island 154 between the source electrodes 173 and the drain electrodes 175.

In exemplary embodiments, the data conductors 171a, 171b, 171c and 175 are formed of a refractory metal such as molybdenum, chromium, tantalum, or titanium, or an alloy of the foregoing metals. The data conductors may have a multilayer structure of a refractory metal layer (not shown) and a low-resistance conductive layer (not shown). Examples of the multilayer structure include a two-layer structure of a chromium or molybdenum (alloy) lower layer and an aluminum (alloy) upper layer, and a three-layer structure of a molybdenum (alloy) lower layer, an aluminum (alloy) intermediate layer and a molybdenum (alloy) upper layer. However, the data conductors 171a, 171b, 171c and 175 may be formed of various metals or conductors, other than the above materials.

The lateral sides of the data conductors 171a, 171b and 171c and 175 are also inclined with respect to the surface of the substrate 110 at an angle of about 30 degrees to about 80 degrees.

The ohmic contacts 163 and 165 are provided only between the underlying semiconductor islands 154 and the overlying data conductors 171a, 171b, 171c and 175 so as to reduce contact resistance therebetween. The semiconductor islands 154 have exposed portions which are not covered with the data conductors 171a, 171b, 171c and 175 between the source electrodes 173 and the drain electrodes 175.

A passivation layer 180 is formed on the exposed portions of the semiconductor islands 154 and the data conductors 171 and 175. The passivation layer 180 may be formed of an organic insulator having a lower dielectric constant so as to have a large thickness. Therefore, even though the pixel electrodes 191 (e.g., 191a, 191b and 191c) overlap the data lines 171a, 171b and 171c, it is possible to prevent a parasitic capacitance from being formed by insulating the pixel electrodes 191 and the data lines 171a, 171b and 171c from each other. The dielectric constant of the organic insulator is preferably 4.0 or less, and the organic insulator may have photosensitivity.

Alternatively, the passivation layer 180 may be formed of an inorganic insulator, and may have a two-layer structure of a lower inorganic layer and an upper organic layer so as to use the excellent insulating characteristics of an organic layer and to prevent the exposed portions of the semiconductor islands 154 from being damaged.

A plurality of contact holes 182 are formed in the passivation layer 180 so as to expose the end portions 179 of the data lines 171, and a plurality of contact holes 185 are formed in the passivation layer 180 so as to expose the drain electrodes 175. A plurality of contact holes 181 are formed in the passivation layer 180 and the gate insulating layer 140 so as to expose the end portions 129 of the gate lines 121.

A plurality of pixel electrodes 191 and a plurality of contact assistants 81 and 82 are formed on the passivation layer 180. The pixel electrodes 191 and the contact assistants 81 and 82 may be formed of a transparent conductor such as ITO or IZO, or a reflective metal such as aluminum, silver, chromium, or an alloy thereof.

As best seen with reference to FIGS. 3, 6A and 6B, each of the pixel electrodes 191 has two parallelogrammic electrode portions with inclination directions which are different from each other. Oblique edges of the electrode portions are connected to each other to form a pair of curved edges (e.g., V-shaped edges).

More specifically, each of the pixel electrodes 191 includes at least one of parallelogrammic electrode portions 196 shown in FIG. 6A and one of the parallelogrammic electrode portions 197 shown in FIG. 6B.

As shown in FIGS. 6A and 6B, each of the electrode portions 196 and 197 has a pair of oblique edges 196o and 197o and a pair of transverse edges 196t and 197t and substantially define a parallelogrammic shape. The oblique edges 196o and 197o are formed at an oblique angle with respect to the transverse edges 196t and 197t, and the oblique angle is in a range of about 45 degrees to about 135 degrees. For convenience sake, the oblique edges 196o and 197o are divided according to a direction (inclination direction) inclined with respect to the bases 196t and 197t of the pair of transverse edges 196t and 197t. When the oblique edges 196o are inclined to the right as shown in FIG. 6A, it is referred to as 'right inclination', and when the oblique edges 197o are inclined to the left as shown in FIG. 6B, it is referred to as 'left inclination'.

The data lines 171a, 171b and 171c extend along the curved edges of the pixel electrodes 191 to have substantially the same shape, as best seen with reference to FIG. 3. At least two data lines 171 overlap one of the pixel electrodes 191, and at least one of data lines 171 is arranged between pixel electrodes 191 which are adjacent to each other in the row direction.

The pixel electrodes 191 are connected to the drain electrodes 175 through the contact holes 185.

The pixel electrodes 191 of the lower panel 100 and the common electrode 270 of the upper panel 200 form a liquid crystal capacitor Clc together with the liquid crystal layer 3 therebetween to maintain the applied voltage after turning off the thin film transistors Q.

The contact assistants 81 and 82 are connected to the end portions 129 of the gate lines 121 and to the end portions 179 of the data lines 171 through the contact holes 181 and 182, respectively. The contact assistants 81 and 82 complement the adhering property between the end portions 129 of the gate lines 121 and the end portions 179 of the data lines 171 and an external device (not shown), and protect them.

Next, the upper panel 200 will be described with specific reference to FIGS. 3 and 4.

A light blocking member 220 is formed on an insulating substrate 210 formed of a transparent glass or plastic. The light blocking member 220 may include a curved portion (not shown) corresponding to the curved edges of the pixel electrodes 191 and a rectangular portion (not shown) corresponding to the thin film transistors. Further, the light blocking member 220 defines an opening that faces the pixel electrodes 191 and prevents light leakage between pixel electrodes 191.

An overcoat 250 is formed on the light blocking member 220. The overcoat 250 may be formed of an organic insulator, and it provides a planarized surface. The overcoat 250 may be omitted.

A common electrode 270 is formed on the overcoat 250. The common electrode 270 is formed of a transparent conductor such as ITO, IZO, etc., and includes a plurality of cutouts 71a, 72a, 73a, 71b, 72b, 73b, 71c, 71b and 71c. The cutouts 71a-c, 72a-c and 73a-c are formed along the curved edge of the pixel electrodes to be substantially parallel to each other.

The number of cutouts 71a-c, 72a-c and 73a-c may be varied depending on the design components. The light blocking member 220 overlaps the cutouts 71a-c, 72a-c, and 73a-c to prevent light leakage around the cutouts 71a-c, 72a-c, and 73a-c.

Alignment layers 11 and 21 are formed on the inner surface of the panels 100 and 200, respectively. The alignment layers 11 and 22 may be vertical alignment layers.

Two polarizers 12 and 22 are provided on the outer surface of the panels 100 and 200, respectively. The polarization axes of the two polarizers are perpendicular to each other, and are preferably formed at 45° with respect to curved edges of the sub-pixel electrodes 191a and 191b. In the case of a reflective liquid crystal display device, one of the two polarizers 12 and 22 may be omitted.

The liquid crystal display device may include a backlight unit (not shown) which emits light to the polarizers 12 and 22, a retardation film (not shown), the panels 100 and 200, and the liquid crystal layer 3.

The liquid crystal layer 3 has negative dielectric anisotropy and is arranged so that the major axis of the liquid crystal molecules is perpendicular to the surface of the two panels 100 and 200 when there is no applied electric field.

The cutouts 71a-c, 72a-c, and 73a-c may be replaced by protrusions (not shown) or depressions (not shown). The protrusions may be formed of an organic material or an inorganic material, and may be formed on or below the electric field generating electrodes 191 and 270.

The operation of the liquid crystal display device will be described in more detail with reference to FIGS. 1 and 7.

Figure 7:
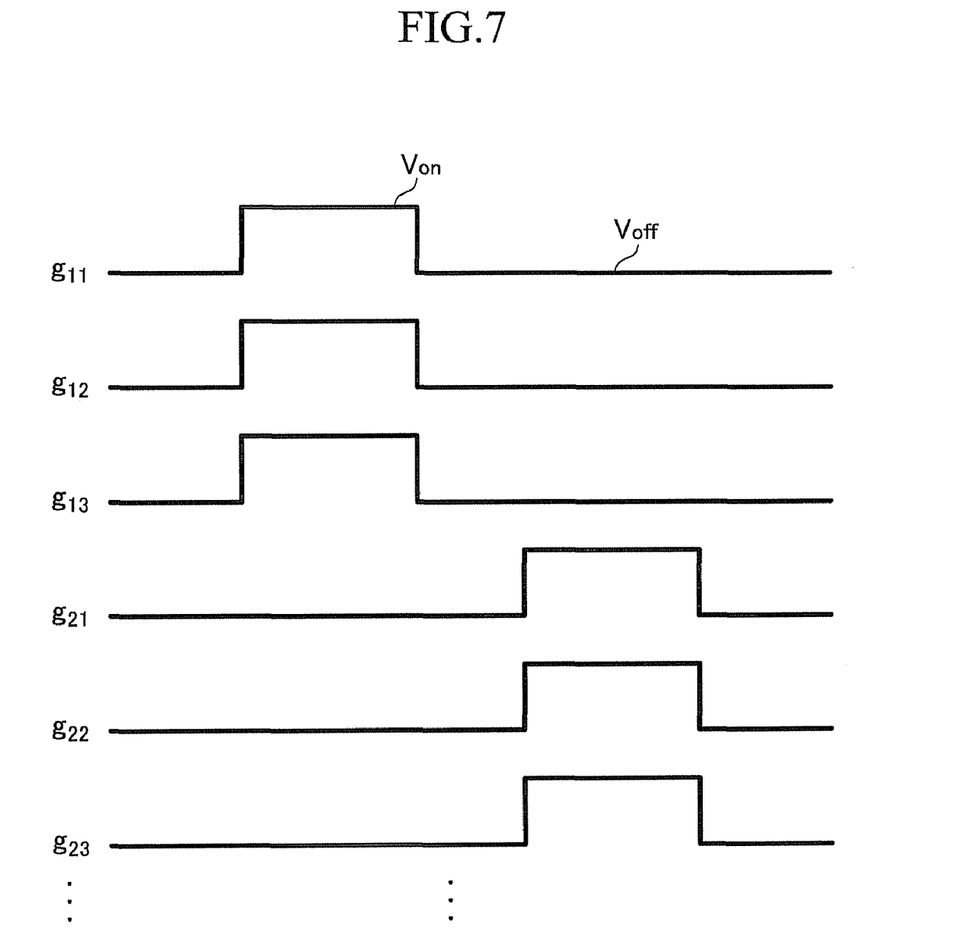
FIG. 7 is a waveform chart showing a gate signal of the liquid crystal display device according to an exemplary embodiment of the present invention.

FIG. 7 is a waveform chart showing a gate signal of the liquid crystal display device according to an exemplary embodiment of the present invention.

The signal controller 600 receives input image signals R, G and B and an input control signal which controls display of the image signals from the external device (not shown). The input image signals R, G and B include luminance information of the respective pixels, and the luminance has a predetermined number of gray levels, for example, 1024 ($=2^{10}$), 256 ($=2^8$), or 64 ($=2^6$) gray levels. Examples of the input control signals include a vertical synchronization signal Vsync, a horizontal synchronization signal Hsync, a main clock signal MCLK, a data enable signal DE, etc.

The signal controller 600 appropriately processes the input image signals R, G and B on the basis of the input control signals according to the operation conditions of the liquid crystal panel assembly 300, and generates a gate control signal CONT1 and a data control signal CONT2, and then outputs the gate control signal CONT1 to the gate driver 400 and outputs the data control signal CONT2 and a processed image signal DAT to the data driver 500.

The gate control signal CONT1 includes a scanning start signal STV for instructing to start scanning and at least one clock signal for controlling output of the gate-on voltage Von. The gate control signal CONT1 may further include an output enable signal OE for defining the duration of the gate-on voltage Von.

The data control signal CONT2 includes a horizontal synchronization start signal STH for informing of the start of transmission of image data for a plurality of pixel rows (hereinafter referred to as pixel row group) connected to one gate line group, a load signal LOAD for instructing to supply data signals to the image data lines $D_{11}$, $D_{12}$, $D_{13}$, $D_{21}$, ..., $D_{m3}$, and a data clock signal HCLK. The data control signal CONT2 may further include an inversion signal RVS which inverts the polarity of the voltage of a data signal corresponding to the common voltage Vcom (hereinafter simply referred to as "polarity of the data signal").

The light source control signal CONT3 includes a control signal which appropriately turns the red, green and blue light sources of the light source unit 950 on or off.

The image data driver 500 receives the image signals DAT for one row of pixels according to the image data control signal CONT2 from the signal controller 600, and selects the gray voltages corresponding to the image signals DAT. Then, the data driver 500 converts the image signals DAT into analog data signals, and applies the converted analog data signals to the image data lines $D_{11}$, $D_{12}$, $D_{13}$, $D_{21}$, ..., $D_{m3}$.

The gate driver 400 sequentially applies the gate-on voltage Von to the first gate line group to the last gate line group on the basis of the gate control signal CONT1 from the signal controller 600 to turn on the switching elements Q connected to all of the gate lines $G_{11}$, $G_{12}$, $G_{13}$, $G_{21}$, ..., $G_{n3}$. Then, the data signals applied to the data lines $D_{11}$, $D_{12}$, $D_{13}$, $D_{21}$, ..., $D_{m3}$ are supplied to the corresponding pixels through the switching elements Q which are in an ON state. As described above, since the same gate signals are supplied to the gate lines of the same gate line group, the gate-on voltage Von is simultaneously supplied to the gate lines $g_{11}$, $g_{12}$, $g_{13}$/$g_{21}$, $g_{22}$, $g_{23}$ of the same gate line group as shown in FIG. 7.

While the operation of scanning the data signal, the light source driver 910 turns the respective light sources of the light source unit 950 on or off on the basis of the light source control signal CONT3 from the signal controller 600. The red, green and blue light sources are sequentially turned on or off for three sub-frames. In this case, the time of a sub-frame is one third of one frame.

Therefore, for a sub-frame when the red light source is turned on, the gate-on voltage Von is sequentially applied from the first gate line group to the last gate line group so that the data lines $D_{11}, D_{12}, D_{13}, D_{21}, \ldots, D_{m3}$ are supplied with a red data voltage corresponding to a red image signal R. For a next sub-frame when the green light source is turned on, the gate-on voltage Von is sequentially applied from the first gate line group to the last gate line group so that the data lines $D_{11}, D_{12}, D_{13}, D_{21}, \ldots, D_{m3}$ are supplied with green data voltage corresponding to a green image signal G. Then, for a next sub-frame when the blue light source is turned on, the gate-on voltage Von is sequentially applied from the first gate line group to the last gate line group so that the data lines $D_{11}, D_{12}, D_{13}, D_{21}, \ldots, D_{m3}$ are supplied with blue data voltage corresponding to a blue image signal B. Therefore, all of the red, green and blue data voltages are applied to display images for one frame.

In this case, since the gate-on voltage Von is simultaneously applied to the three gate lines, the gate-on voltages applied to gate lines $G_1, G_{12}, G_{13}, G_{21}, \ldots, G_{n3}$ for one sub-frame are maintained for one horizontal period (which is referred to as "1H" and is equal to one period of the horizontal synchronization signal Hsync and the data enable signal DE). That is, even though the red, green and blue data voltages corresponding to the red, green and blue image signals R, G B are applied for three sub-frames corresponding to the turning-on timing of the red, green and blue light sources for one frame, the charging time of the red, green and blue data voltages is substantially the same as the charging time in the case of displaying colors using a spatial division method which uses color filters.

The difference between the data voltage applied to the pixel and the common voltage Vcom is represented as a storage voltage of the liquid crystal storage unit Clc, that is, a pixel voltage. The inclination directions of liquid crystal molecules vary depending on the amplitude of the pixel voltage, which causes the polarization of light passing through the liquid crystal layer 3 to vary. The variation in polarization causes a variation in the transmittance of light by the polarizer mounted on the liquid crystal panel assembly 300, thereby displaying desired images.

The inclination directions of the liquid crystal molecules are primarily determined by the horizontal component which is generated by distorting the main electric field by the cutouts 91a-c, 92a-c (see FIG. 8), 71a-c, 72a-c, and 73a-c of the electric field generating electrodes 191 and 270 and the edges of the pixel electrodes 191. These main electric field components are almost perpendicular to the edges of the cutouts 91a-c, 92a-c (see FIG. 8), 71a-c, 72a-c, and 73a-c and the edges of the pixel electrodes 191.

Since the liquid crystal molecules on the sub-region divided by the cutouts 91a-c, 92a-c (see FIG. 8), 71a-c, 72a-c, and 73a-c are inclined in a direction perpendicular to the main edge, the number of inclination directions is plural. The reference viewing angle of the liquid crystal display increases due to the various inclination directions of the liquid crystal molecules as a result of the inclination direction determining members 91a-c, 92a-c (see FIG. 8), 71a-c, 72a-c, and 73a-c.

When one frame has ended, the next frame starts. In this case, the state of the inversion signal RVS applied to the data driver 500 is controlled such that the polarity of the data signal applied to each pixel is opposite to the polarity of the data signal in the previous frame (e.g., frame inversion). The polarity of the data signal applied to one data line may be inverted in the same frame according to the characteristic of the inversion signal RVS (e.g., row inversion and dot inversion), and the polarities of the data signals applied to the same pixel rows may be different from each other (e.g., column inversion and dot inversion).

Now, referring to FIG. 8, a liquid crystal panel assembly according to another exemplary embodiment of the present invention will be described.

Figure 8:
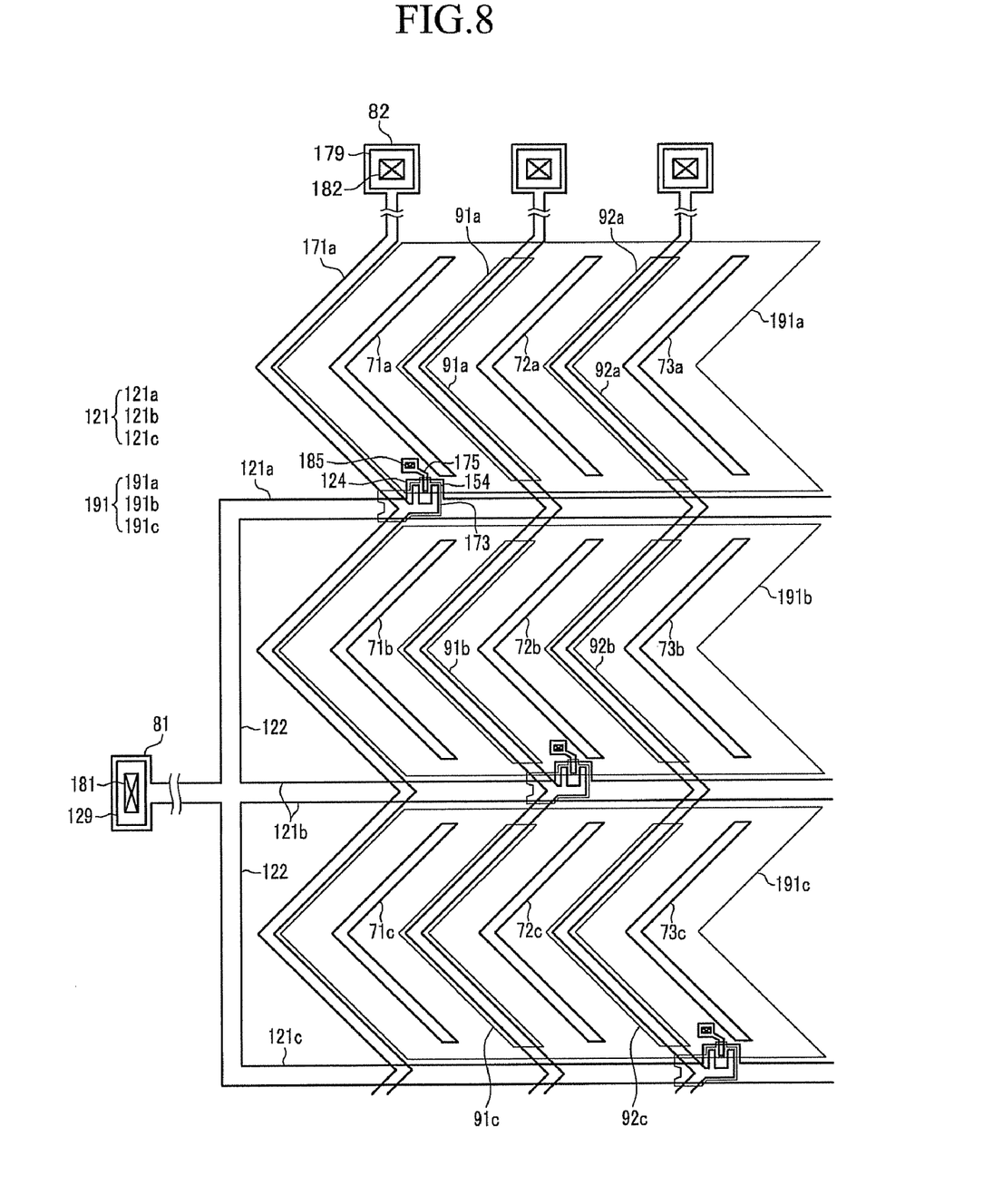
FIG. 8 is a diagram showing an arrangement of a liquid crystal display device according to another exemplary embodiment of the present invention.

FIG. 8 is a plan view showing an arrangement of the liquid crystal panel assembly according to another exemplary embodiment of the present invention.

Referring to FIG. 8, the liquid crystal panel assembly according to this embodiment includes a thin film transistor panel (not shown), a common electrode panel (not shown) and a liquid crystal layer (not shown) interposed therebetween.

The layer structure of the liquid crystal panel assembly according to this alternative exemplary embodiment is almost the same as the layer structure of the liquid crystal panel assembly shown in FIG. 3 to FIG. 5.

As for the thin film transistor panel, a gate conductor including a plurality of gate lines 121 is formed on an insulating substrate (not shown). Each of the gate lines 121 includes a gate electrode 124 and an end portion 129. A gate insulating layer (now shown) is formed on the gate conductor 121. A plurality of semiconductor islands 154 are formed on the gate insulating layer, and a plurality of ohmic contacts (not shown) are formed thereon. A data conductor including a plurality of data lines 171a, 171b and 171c and a plurality of drain electrodes 175 is formed on the ohmic contacts. The data lines 171a, 171b and 171c include a plurality of source electrodes 173 and end portions 179. A passivation layer (not shown) is formed on exposed portions of the semiconductor islands 154a and the data conductors 171a, 171b, 171c and 175, and a plurality of contact holes 181, 182 and 185 are formed in the passivation layer and the gate insulating layer. A plurality of pixel electrodes 191 and a plurality of contact assistants 81 and 82 are formed on the passivation layer. An alignment film (not shown) is formed on the pixel electrodes 191 and the contact assistants 81 and 82.

As for the upper panel, a light blocking member, a plurality of color filters, an overcoat, a common electrode including cutouts, and an alignment film are formed on the insulating substrate.

In the liquid crystal panel assembly according to this alternative exemplary embodiment, a plurality of cutouts 91a, 92a, 91b, 92b, 91c and 92c are formed on the pixel electrode 191. Portions of the data lines which overlap the pixel electrode exposed through the cutouts 91a, 92a, 91b, 92b, 91c, and 92c. That is, the cutouts 91a, 92a, 91b, 92b, 91c, and 92c are formed to be substantially parallel to the data lines 171a, 171b and 171c extending along the curved portion of the pixel electrode 191. Therefore, it is possible to minimize the overlapping area of the pixel electrode 191 and the data lines 171a, 171b and 171c. It is further possible to prevent the variation of the voltage of the pixel electrode 191 due to the data signal which flows through the data line 171 not connected to the pixel electrode 191.

According to this invention, it is possible to secure sufficient charging time in the temporal division type of liquid crystal display device and to realize a wide viewing angle.

While this invention has been described in connection with what is presently considered to be practical exemplary embodiments, it is to be understood that the present invention is not limited to the disclosed exemplary embodiments, but, on the contrary, is intended to cover various modifications and equivalent arrangements included within the spirit and scope of the appended claims.

What is claimed is:

1. A liquid crystal display device, comprising:
   a substrate;
   first, second and third pixel electrodes formed on the substrate, and are adjacent to each other in a column direction;
   first, second and third gate lines connected to the first, second and third pixel electrodes, respectively; and
   first, second and third data lines which cross the first, second and third gate lines and are connected to the first, second and third pixel electrodes, respectively,
   wherein each of the first to third pixel electrodes comprises at least two parallelogrammic electrode portions with different inclination directions from each other,
   at least two data lines of the first to third data lines being overlapped by all the first to third pixel electrodes, and
   the first to third gate lines are connected to each other.

2. The liquid crystal display device of claim 1, further comprising a light source unit which comprises a plurality of single color light sources which emit light to the substrate.

3. The liquid crystal display device of claim 2, wherein the single color light sources emit three color light components.

4. The liquid crystal display device of claim 3, wherein the single color light sources emit a red, green or blue light component.

5. The liquid crystal display device of claim 4, wherein the single color light sources each comprise a light emitting diode.

6. The liquid crystal display device of claim 1, wherein the first to third data lines are curved at least once according to the inclination direction of the parallelogrammic electrode portions.

7. The liquid crystal display device of claim 1, wherein at least one of the first to third pixel electrodes further comprises a plurality of cutouts which expose at least a portion of the first to third data lines.

8. The liquid crystal display device of claim 1, wherein at least one of the first to third pixel electrodes further comprises a plurality of protrusions extending from one side of the first to third pixel electrodes.

9. The liquid crystal display device of claim 1, wherein the first to third gate lines are supplied with a same gate-on signal.

10. The liquid crystal display device of claim 9, wherein the gate signal is a gate-on signal applied for one horizontal period.

11. The liquid crystal display device of claim 1, further comprising
    a common electrode facing the pixel electrodes,
    wherein the common electrode comprises an inclination direction determining member.

12. The liquid crystal display device of claim 11, wherein the inclination direction determining member comprises cutouts which extend along the inclination direction of the parallelogrammic electrode portions in a row direction.

13. The liquid crystal display device of claim 11, wherein the inclination direction determining member comprises protrusions which extend along the inclination direction of the parallelogrammic electrode portions in a row direction.

14. The liquid crystal display device of claim 1, further comprising an organic layer formed between the first to third pixel electrodes and the first to third data lines.

15. The liquid crystal display device of claim 1, further comprising a fourth gate line that is connected to the first to third gate lines.

16. The liquid crystal display device of claim 1, wherein the inclination degrees of the parallelogrammic electrode portions relative to the first, the second and the third data lines is about 45° or about 135°.

17. A liquid crystal display device, comprising:
    a substrate;
    first, second and third pixel electrodes formed on the substrate, and are adjacent to each other in a column direction;
    first, second and third gate lines connected to the first, second and third pixel electrodes, respectively; and
    first, second and third data lines which cross the first, second and third gate lines and are connected to the first, second and third pixel electrodes, respectively,
    wherein each of the first to third pixel electrodes has a pair of bent edges substantially parallel to each other,
    at least two data lines of the first to third data lines being overlapped by all the first to third pixel electrodes, and
    the first to third gate lines are connected to each other.

18. The liquid crystal display device of claim 17, wherein the bent edges are bent at least once.

19. A method of manufacturing a liquid crystal display device, the method comprising:
    forming first, second and third pixel electrodes adjacent to each other in a column direction on a substrate, each of the first to third pixel electrodes are formed to comprise at least two parallelogrammic electrode portions with different inclination directions from each other;
    connecting first, second and third gate lines to the first, second and third pixel electrodes, respectively;
    forming first, second and third data lines to cross the first, second and third gate lines and connected to the first, second and third pixel electrodes, respectively,
    overlapping at least two data lines of the first to third data lines with all the first to third pixel electrodes, and connecting the first to third gate lines to each other.

* * * * *